United States Patent [19]

Lustig et al.

[11] Patent Number: 5,077,109
[45] Date of Patent: * Dec. 31, 1991

[54] ORIENTED MULTILAYER FILM AND PROCESS FOR MAKING SAME

[75] Inventors: Stanley Lustig, Park Forest; Stephen J. Vicik, Darien, both of Ill.

[73] Assignee: Viskase Corporation, Chicago, Ill.

[*] Notice: The portion of the term of this patent subsequent to Mar. 27, 2007 has been disclaimed.

[21] Appl. No.: 498,876

[22] Filed: Mar. 26, 1990

Related U.S. Application Data

[63] Continuation of Ser. No. 91,172, Aug. 31, 1987, Pat. No. 4,911,963.

[51] Int. Cl.⁵ .................. B32B 27/08; F16L 11/00
[52] U.S. Cl. ...................... 428/36.91; 264/209.1; 264/211.12; 264/235.6; 264/235.8; 264/564; 428/213; 428/474.4; 428/475.5; 428/476.1
[58] Field of Search ............... 428/516, 518, 212, 213, 428/474.4, 475.5, 475.8, 476.1, 412, 347, 327, 36.91, 34.1, 34.7, 34.8, 349, 35.2, 35.4, 332, 412, 216, 339; 264/176.1, 235.8, 564; 138/137; 528/324

[56] References Cited

U.S. PATENT DOCUMENTS

| | | | |
|---|---|---|---|
| 3,449,299 | 6/1969 | Schneider et al. | 264/176.1 X |
| 3,456,044 | 7/1969 | Pahlke | 264/25 |
| 3,741,253 | 6/1973 | Brax et al. | 138/137 |
| 3,840,427 | 10/1974 | Brazier et al. | 428/476.1 |
| 4,044,187 | 8/1977 | Kremkau | 428/212 |
| 4,095,012 | 6/1978 | Schirmer | 428/516 X |
| 4,104,404 | 8/1978 | Bieler et al. | 428/35.2 |
| 4,197,326 | 4/1980 | Wakamatsu et al. | 426/412 |
| 4,254,169 | 3/1981 | Schroeder | 428/516 X |
| 4,303,711 | 12/1981 | Erk et al. | 428/34.8 |
| 4,532,100 | 7/1985 | Lancaster et al. | 264/564 |
| 4,615,922 | 10/1986 | Newsome et al. | 428/35.4 |
| 4,647,483 | 3/1987 | Tse et al. | 428/474.4 |
| 4,652,490 | 3/1987 | Arita et al. | 428/347 |
| 4,668,571 | 5/1987 | Moriarity, Jr. | 428/327 |
| 4,686,125 | 8/1987 | Johnston et al. | 428/35.2 |
| 4,687,688 | 8/1987 | Curie et al. | 428/35.2 |
| 4,698,195 | 10/1987 | Okumura et al. | 264/235.8 |
| 4,724,185 | 2/1988 | Shah | 428/339 |
| 4,800,129 | 1/1989 | Deak | 428/474.4 |
| 4,826,955 | 5/1989 | Akkapeddi et al. | 528/324 |
| 4,908,272 | 3/1990 | Harada et al. | 428/412 |
| 4,911,963 | 3/1990 | Lustig et al. | 428/36.91 |

FOREIGN PATENT DOCUMENTS 0214314 3/1987 European Pat. Off.
236099 9/1987 European Pat. Off.
240632 10/1987 European Pat. Off.

OTHER PUBLICATIONS

CAS Registry No. 25750-23-6, p. 1 Chemname, File 301 (Dialog Information Services, Inc., Palo Alto, CA).
Bennett (Ed.), *Concise Chemical and Technical Dictionary*, 4th Ed. 1, p. 574 (1986, Chemical Publishing Co., Inc.).
"Glass Transition", Encyclopedia of Polymer Science and Engineering, 2nd Ed., vol. 7, pp. 531-544 (1987, John Wiley & Sons, Inc.).
*Hawley's Condensed Chemical Dictionary*, 11th Ed., p. 564 (1987, Van Nostrand Reinhold Company, Inc.).
*Modern Plastics Encyclopedia 1988*, vol. 64, No. 10A, p. 537 (Oct. 1987, McGraw-Hill, Inc.).
Brandup et al., (Eds.), *Polymer Handbook*, 2nd Ed., pp. II-167 to III-171 (1975, John Wiley & Sons, Inc.).
"Structure-Property Relationships in Amorphous Polyamides", *Polymer*, vol. 17, pp. 875-892, Oct. 1976 (IPC Science and Technology Press Limited, Eng.).
"More News in Packaging Materials", *Plastics Technology*, vol. 32, No. 2, pp. 5, 28, 30, Feb. 1986 (Bill Communications, Inc., New York).
"Coextrusion Developments Focus on Barrier Resins", *Plastics Technology*, vol. 33, No. 13, pp. 5, 77-79, Dec. 1987 (Bill Communications, Inc., NY).
Selar PA 3426 Barrier Resin, Bulletin E-73974, DuPont Company, 12/1985.
Nylon 6I/6T Resins, 52nd Fed. Reg. 26667, 1987 (CAS Reg. No. 25750-23-6).

Primary Examiner—Thomas J. Herbert, Jr.
Attorney, Agent, or Firm—Cedric M. Richeson

[57] ABSTRACT

An oriented multilayer film comprising a barrier layer, a first layer on one side of said barrier layer and a second layer on the opposite side of said barrier layer is provided for use in food packaging applications. The first and second layers have melting points of at least about 115° C. The barrier layer comprises amorphous nylon having a glass transition temperature greater than the higher of the two melting points or higher than the melting point of the first and second layers. The barrier layer is substantially impermeable to oxygen, while the first and second layers may comprise certain polyethylene resins. The oxygen barrier properties of the film do not deteriorate as the barrier layer gradually absorbs moisture. A process for making such multilayer films is also provided.

34 Claims, No Drawings

ORIENTED MULTILAYER FILM AND PROCESS FOR MAKING SAME

CROSS-REFERENCE TO RELATED APPLICATION

This application is a continuation application of pending application Serial No. 07/091,172, filed Aug. 31, 1987 entitled "Multilayer Film Containing Amorphous Nylon", now U.S. Pat. No. 4,911,963 whose disclosure and teachings are hereby incorporated by reference in their entirety.

FIELD TO THE INVENTION

The invention relates to oriented multilayer films for use in barrier packaging applications.

BACKGROUND OF THE INVENTION

The packaging of food articles such as fresh red meat, processed meat products, and poultry requires tough, puncture resistant, yet flexible film materials. The films must be substantially impermeable to oxygen, in order to prevent spoilage of the food product and to maintain vacuum where vacuum packaging is employed. It is also important that the films be substantially impermeable to moisture, in order to prevent leakage from within the package.

Oriented amide polymers, hereinafter referred to as nylons, are well known in the packaging industry for their toughness, puncture resistance, and oxygen barrier properties. The oxygen barrier properties of oriented nylon films generally occur when the nylon contains zero or low amounts of absorbed moisture. As the moisture content increases, the oxygen barrier properties of most oriented nylons deteriorate. When the application involves exposure of the film to high humidity or other moist conditions it becomes desirable to encapsulate the nylon between layers having relatively low permeability to moisture, in order to keep the nylon dry. It is also desirable that one of the layers have good heat seal properties. Resins which have both good heat sealability and are substantially impermeable to moisture include various polyethylenes, ethylene copolymers and ionomers. Oriented nylon films are currently used alone and in combination with these heat sealable and moisture resistant layers.

In the packaging of red meat, for instance, an inner layer of polyethylene, ethylene vinyl acetate, or ionomer acts as a sealant layer and prevents permeation of moisture from within the package. A barrier layer of nylon, such as Nylon 6 (polycaproamide) manufactured by Allied Corporation, protects the meat from exposure to oxygen from the atmosphere, thus preventing spoilage. An outer layer of polyethylene or ethylene vinyl acetate protects the nylon from exposure to moisture from the atmosphere.

In a typical process for producing multilayer films containing oriented nylon, the nylon film is oriented by heating to a softened state below the melting point and stretching the softened material. Many conventional nylon resins crystallize very rapidly and have melting points well in excess of the adjacent polyethylene layers. Because the nylon and polyethylene tend to have different stretching characteristics, the nylon must generally be oriented separately and in advance of its combination with the adjacent polyethylene layers. The combination of the oriented nylon with the adjacent layers is then accomplished using a conventional lamination process. This requires a special adhesive, typically a polyurethane type adhesive applied with a coater-laminator.

Another problem with current multilayer oriented nylon structures is that, while the polyethylene generally protects the nylon from moisture, some moisture gradually seeps in from either the packaged food article or the atmosphere and is absorbed by the nylon. This causes an increase in oxygen permeability which shortens the shelf life of sensitive foods.

Because of recent growth in the market for barrier films there currently exists an industrywide search for films with improved barrier properties such as low oxygen permeability and low water permeability. For economic reasons, there is also a demand for an oriented nylon multilayer film which can be produced by a coextrusion process. Production of multilayer films by coextrusion is more economical than lamination methods of the prior art.

It is therefore an object of the present invention to provide a multilayer film structure having low oxygen permeability and preferably low water permeability.

It is a further object of the present invention to provide a multilayer film structure comprising a nylon barrier layer having a low oxygen permeability which does not increase as the nylon gradually absorbs moisture.

A still further object of the invention is to provide a multilayer film structure comprising a nylon barrier layer which can be produced economically by a coextrusion process.

A still yet further object of the present invention is to provide a multilayer film structure comprising a nylon containing barrier layer which may be oriented in combination with polymer materials that have melting points below the glass transition temperature of the nylon.

It is to be understood that additional objectives which will become apparent in view of the specification are also contemplated. Further, these objectives are not to be considered a limitation of the present invention, the spirit and scope of which is delineated in the appended claims.

SUMMARY OF THE INVENTION

In accordance with one embodiment of the present invention, there is provided an oriented multilayer structure having a barrier layer, a first layer on one side of the barrier layer, and a second layer on the other side of the barrier layer. The first and second layers have melting points of at least about 115° C. The barrier layer comprises amorphous nylon having a glass transition temperature greater than the higher of the two melting points, or higher than the melting point of the first and the second layer. The film may be single axis or biaxially oriented. In accordance with a preferred embodiment of the invention, the amorphous nylon of the barrier layer comprises Selar (TM) Polyamide 3426 Barrier Resin, an amorphous nylon (polyamide) resin manufactured by and available from the Du Pont Company.

In accordance with another embodiment of the present invention there is provided a process for producing an oriented multilayer film. The process comprises the step of coextruding a barrier layer, a first layer on one side of the barrier layer, and a second layer on the other side of the barrier layer. The first and second layers have melting points of at least about 115° C. The barrier layer comprises amorphous nylon (polyamide) resin having a glass transition temperature greater than the higher of the two melting points or higher than the melting point of both the first and second layers. After coextrusion the multilayer film is oriented by stretching. In accordance with still a further embodiment, the puncture resistance of the multilayer film may be improved by cross-linking the multilayer structure, preferably by irradiation.

DETAILED DESCRIPTION OF THE PRESENTLY PREFERRED EMBODIMENTS

In accordance with the present invention, the barrier layer comprises amorphous nylon (polyamide) resin having a glass transition temperature greater than the higher of the two melting points or higher than the melting point of the resins of both a first layer on one side of the barrier layer and a second layer on the other side of the barrier layer. Surprisingly, it has been found that in accordance with one embodiment of the present invention the foregoing multilayer film structure can be coextruded and then oriented at temperatures below the melting points of the first and second layers even though the glass transition temperature of the amorphous nylon is greater than the higher of the two melting points or greater than the melting point of the adjacent layers.

The barrier layer may be formed entirely of amorphous nylon resin or other materials may be included in small portions as blends therewith as long as the oxygen barrier property is not eliminated and the resulting blend may adequately bond to adjacent layers. Suitable blending materials include hydrolyzed ethylene-vinyl acetate copolymer (EVOH), ethylene vinyl acetate (EVA) and ionomers.

In a preferred embodiment of the present invention, the amorphous nylon (polyamide) resin comprises Selar (TM) Polyamide 3426, having a glass transition temperature of 127° C. It has been found that when the barrier layer of a multilayer film structure comprises this particular amorphous nylon, the film structure may be oriented in combination with first and second layers comprising certain polyethylene resins at temperatures substantially below those expected by those skilled in the art, provided that the polyethylene has a melting point of at least about 115° C. Thus, any coextrusion process, followed by inline orientation of the multilayer structure by conventional techniques may now be employed.

Selar Polyamide 3426, manufactured by the Du Pont Company, is believed to be substantially amorphous and has a density of 1.19 grams per cubic centimeter. Further, according to the manufacturer's published description, Selar Polyamide 3426 has excellent melt strength (i.e. strength of the material at the extrudate temperature) and can be used under a much broader range of processing conditions than conventional semi-crystalline nylons. Selar Polyamide 3426 is otherwise characterized as a Nylon 6I/6T resin (CAS Reg. No. 25750-23-6), manufactured by the condensation of hexamethylenediamine, terephthalic acid, and isophthalic acid such that 65 to 80 percent of the polymer units are derived from hexamethylene isophthalamide. (See 52 Fed. Reg. 26,667, 1987, the disclosures of which are incorporated herein by reference). This particular amorphous polyamide resin is further described and characterized in Bulletin E-73974 (12/85) available from Du Pont Company, said Bulletin being incorporated herein by reference.

Selar Polyamide 3426 may be formed as a barrier layer with adjacent polyethylene layers as contemplated herein into a multilayer film by known coextrusion techniques. As a result, sufficient interlayer adhesion can be obtained between the Selar Polyamide and adjacent layers for certain end uses, as for example, for selected meat packaging applications.

Unlike the known nylon resins of the prior art, the oxygen barrier properties of Selar Polyamide 3426 improve, rather than deteriorate, as the film absorbs moisture. Accordingly, oriented multilayer films comprising Selar Polyamide 3426 in the barrier layer provide longer shelf life for oxygen sensitive foods than the known nylon multilayer structures of the prior art.

Multilayer films utilizing Selar Polyamide 3426 in the barrier layer that are biaxially oriented are also believed to yield still further improvement in oxygen barrier properties.

According to the present invention, the film structures contemplated comprise a plurality of layers. Preferably, the multilayer film comprises three layers; a barrier layer, a first outer layer on one side of the barrier layer, and a second outer layer on the opposite side of the barrier layer. In general, the first and second outer layers comprise materials having a melting point of at least about 115° C. It is to be understood, however, that the melting points of the first and second layers do not have to be the same. Thus, for example, the melting point of the first layer may be greater than, less than, or equal to that of the second layer, and vice-versa. In addition, the first and second layers should have good heat seal and optical properties. Furthermore, though not necessary to the invention, these layers may also possess low water permeability to prevent spoilage. The barrier layer, which is also referred to as the core layer, possesses low oxygen permeability characteristics, further preventing spoilage of the packaged product.

Though the presently preferred embodiments contemplate three layers in the multilayer film structure, it is to be understood that additional layers may also be present to satisfy special requirements. For example, one or more adhesive layers formed of chemically modified polyethylene, e.g. Plexar or ethylene acrylic acids, may be employed between the barrier layer and the first or second layers As another variation, a fourth layer with special properties may be added to the layer which is intended the inside layer relative to an enclosed food product For example, to achieve improved meat adhesion the practitioner may use a fourth layer comprising the metal salt of an ethylene-organic acid copolymer sold by the Du Pont Company under the product designation Surlyn 1650.

According to a preferred embodiment, in terms of film thickness when used to form heat sealed bags, the multilayer film structure comprises between about 45% to 55% and preferably about 50% of the layer on the side of the barrier layer closest to the packaged product, about 20% to 30% and preferably about 25% barrier layer, and about 20% to 35% and preferably about 25% of the layer on the side of the barrier layer opposite from the packaged product. The barrier layer is preferably in this range to insure low water and oxygen permeability (at the low end) and avoid stretch orientation difficulties (at the high end). The layer closest to the packaged product must be sufficiently thick to insure heat sealing integrity, and the layer on the side of the barrier layer opposite from the packaged product must be sufficiently thick to withstand physical abuse. However, it is to be understood that the thickness of individual layers and the ratios of layer thicknesses is based on particular requirements of use, will be decided by those skilled in the art.

According to one preferred embodiment of the present invention, either one or both of the first and second layers comprise linear low density polyethylene (LLDPE). LLDPE is commonly known to those skilled in the art to have a melting point of approximately 120° C. and a density between about 0.91 and 0.93 g/cm$^3$. LLDPE has excellent heat seal properties and a low moisture vapor transmission rate. Also, LLDPE is very strong, making it suitable for use in multilayer films for a wide variety of barrier packaging applications.

In another embodiment of the present invention, either one or both of the first and second layers comprise very low density polyethylene (VLDPE). VLDPE is known to those skilled in the art to have a melting point of about 120° C. and a density between about 0.88 and 0.91 g/cm$^3$. VLDPE is especially advantageous in applications requiring improved hot tack.

In accordance with the present invention, blends of any suitable thermoplastic packaging material, and preferably the foregoing polyethylene resins may also be utilized in at least one of the first and second layers of the multilayer barrier film. Accordingly, however, any such blend must contain at least about 90 weight percent of a component having a melting point greater than 115° C. Preferably, the present invention contemplates blends wherein at least one of the first and second layers comprises LLDPE or VLDPE in amounts of at least 90 weight percent.

Though blends comprising any suitable thermoplastic packaging material are contemplated, blends comprising minor amounts of ethylene vinyl acetate (EVA) copolymers or low density polyethylene (LDPE) are preferably contemplated. EVA copolymer and LDPE, are known to have melting points of about 95° C. and 110° C. respectively. Accordingly, the present invention contemplates blends comprising minor amounts of either EVA copolymers or LDPE in any combination with either LLDPE or VLDPE in any combination Preferably EVA copolymer and LDPE are present in blend amounts of up to about 10 weight percent. The particular blends mentioned herein, however, are not to be considered a limitation of the invention.

The EVA copolymers contemplated as minor constituent blends may be manufactured by either the tubular or stirred methods commonly known to those skilled in the art. Preferably, the EVA copolymers will comprise between about 1 to 20 percent vinyl acetate by weight and most preferably about 3 to 12 percent by weight EVA copolymer is known to produce a high clarity film having good heat seal properties.

As a further variation, certain adhesives may also be blended in the layers, as for example an ethylene based polymer containing vinyl acetate and anhydride functionality sold by the Du Pont Company under the product description Bynel CXA 3048.

After formation, the multilayer film of this invention is oriented by stretching in at least one direction, i.e. uniaxially in either the longitudinal or transverse direction, or in both directions, i.e. biaxially by techniques known to those skilled in the art.

In accordance with a presently preferred embodiment of the invention, the multilayer film is manufactured by combining the amorphous nylon containing barrier layer with the first and second layers by coextrusion processes known in the art. The multilayer film is then oriented, preferably by stretching the structure in both the transverse and machine directions in order to achieve biaxial orientation. Biaxial orientation is believed to yield still further improvement in oxygen barrier properties.

In a highly preferred embodiment of the invention, the layers are first coextruded and then biaxially oriented using a double bubble process of the type described in U.S. Pat. No. 3,456,044 which is incorporated herein by reference. In this process the primary tube is simultaneously stretched in the transverse direction by air pressure and in the longitudinal or machine direction by the use of pinch rolls at different speeds. It was surprising that double bubble-extruded film demonstrated acceptable adhesion characteristics since blown films of the same composition showed poor adhesion characteristics.

Processing conditions contemplated by the present invention will vary depending on the type of manufacturing process used. Coextrusion temperatures, for example, may range between approximately 175° C. and 250° C. In the preferred double bubble coextrusion process, the biaxial orientation temperature must be below the melting temperature of the outer layers, and preferably between about 10° C. to 20° C. below the lower of the melting points of the outside layers.

In accordance with a particularly preferred embodiment, the amorphous nylon containing barrier layer comprises Selar Polyamide 3426 and the first and second layers comprise LLDPE. When manufactured, the particular multilayer structure is coextruded using die temperatures of about 220°-240° C. and is biaxially oriented at an orientation temperature of about 100° C. to 110° C. It was surprising that a multilayer film comprising SELAR and LLDPE could be bioriented. According to commercial literature available from Du Pont, Selar has a glass transition point of 127° C. Thus, one skilled in the art would expect that orientation of the film would have to occur at temperatures above the melting point of LLDPE. It is known to those skilled in the art that LLDPE has a melting point of about 120° C.—substantially lower than the glass transition point of SELAR. Since according to commonly known orientation techniques, one usually orients at temperatures below the melting temperatures of one of the layer components, it would be unexpected to one skilled in the art to combine layers having melting points lower than the glass transition point of SELAR since these layers would melt at the higher orientation temperatures theoretically required for SELAR.

Yet, according to the present invention, it has been found that a multilayer film having an amorphous nylon containing barrier layer, such as SELAR, in combination with first and second layers as described herein surprisingly can be oriented. Without being limited to theory, according to conventional processing techniques, it is known that the orientation bubble is formed after passing the coextruded film through conventional infrared heaters. The latter are conventionally set to provide an exit orientation temperature as measured at the outside of the film of about 10° C. to 20° C. below the lower of the melting points of the first and second layers. It is theorized that the outer layers absorb infrared heat at one particular wave length while the amorphous nylon resin absorbs the infrared heat at various wave lengths. Thus, it is possible that infrared heat at various wave lengths may penetrate the outer portions of the coextruded film without heating and cause the amorphous nylon to reach a temperature suitable for orientation. The amorphous nylon appears to be receptive to heating by such penetrating infrared waves.

Orientation is a major factor in determining the minimum melting point of the first and second layers of the multilayer film of the present invention. If the orientation temperature is too low, the film structure of the present invention will not orient. Thus, even though the melting points of the first and second layers are less than the glass transition temperature of the amorphous nylon contained in the barrier layer, the melting points must be above at least about 115° C. A minimum melting point of about 115° C. will allow the orientation temperature to be sufficiently high to orient the multilayer film of the present invention.

Many applications require multilayer barrier films with high puncture resistance. In still another embodiment of the present invention, the puncture resistance of the multilayer film structure may be improved by cross-linking one or more layers. This may be accomplished by the inclusion of a cross-linking agent, but is preferably done by treatment with a dosage of irradiation subsequent to orientation (i.e. post-irradiation). Alternatively a single layer may be extruded, oriented and then irradiated, followed by coating lamination of the other layers. Various irradiation procedures are described in U.S. Pat. No. 4,044,187. Preferably the dosage contemplated is small and between about 1 Mrad and about 10 Mrad. Most preferably, the irradiation dosage is about 2-4 Mrad.

The multilayer film of this invention is preferably produced by the coextrusion-double bubble method. The multilayer film may also be fabricated by extrusion coating, wherein a base tube is extruded and succeeding layers are surface coated on the base tube in a manner such as that disclosed in U.S. Pat. No. 3,741,253. Also, the multilayer film may be slot cast and biaxially stretched by tentering before the resulting sheet is fabricated into bags. Still further, the inventive multilayer film may be fabricated by producing separate film layers and then laminating the layers together.

This multilayer film is wound up as flattened, seamless, tubular film to be used later to make bags. This may be accomplished by end seals, typically made by transverse heat sealing across the width of flattened tubing followed by severing the tubing so that the transverse seal forms the bag bottom. Alternatively, side-seal bags may be formed in which the transverse seals form the bag sides and one edge of the tubing forms the bag bottom.

Various conventional additives such as slip agents, anti-block agents, plasticizers and pigments can be incorporated in the multilayer film of this invention, as is well-known in the art.

The following examples are intended as illustrations of the present invention and are not to be considered as limiting. It is to be understood that equivalents of the present invention are also intended, the spirit and scope of which is defined in the appended claims.

EXAMPLE 1

A three layer biaxially oriented coextruded structure was produced using a double bubble coextrusion process. The barrier layer consisted of Selar Polyamide 3426 Barrier Resin (glass transition 127° C.) manufactured by Du Pont. Both the first outer layer and the second outer layer consisted of UCC 7510 LLDPE (Density 0.920 g/cc, Melt Index 0.65 g/10 min., Melting Point 120° C.) manufactured by Union Carbide. The layer thicknesses were 20% for the barrier layer and 40% for each of the outer layers Extrusion temperatures were 425° F. (218° C.) for the barrier layer and 350° F. (177° C.) for both outer layers. The die diameter was 1.25 inches. The primary tubing was 3.75 inch flat width and the secondary tubing was 10 inch flat width with a thickness of 2.65 mils. The biorientation temperature was about 105° C.

The resulting multilayer film had a machine direction tensile strength of 7,500 psi and a transverse direction tensile strength of 10,000 psi. The multilayer film had an oxygen transmission rate of 2.6 cc/100 in$^2$/24 hrs. The adhesion between layers was satisfactory for use of the film in the form of a bag for packaging of fresh red meat. This was demonstrated by a tensile strength test based on ASTM Method D882. The oriented structure provided a smooth stress-strain curve with no evidence of layer separation up to the break point.

A similar structure (nonoriented) was produced by a conventional blown film coextrusion process at similar processing conditions. The layer thicknesses were again 20% for the barrier layer and 40% for each outer layer. The resulting film had a thickness of 4.5 mils and a flat width of 6.5 inches. The blown film structure delaminated readily and could not be used as a composite. This illustrates that the double bubble process provides improved interlayer adhesion.

EXAMPLE 2

A three layer biaxially oriented coextruded structure was produced by a double bubble coextrusion process at extrusion conditions similar to those in Example 1. The barrier layer consisted of Selar Polyamide 3426 Barrier Resin. Both the first outer layer and the second outer layer consisted of UCC 7510 LLDPE. Some of the film was treated with an irradiation dosage of 3 Mrad. The untreated film had an impact strength of 0.3 kg-cm/mil. The irradiated film had an impact strength of 1.0 kg-cm/mil. This comparison demonstrates the improved puncture resistance attainable by cross-linking the multilayer film of this invention.

What is claimed is:

1. An oriented multilayer film comprising a core layer, a first layer on one side of core layer and a second layer on the opposite side of said core layer wherein said first layer and said second layer have melting points of at least about 115° C. and said core layer has a glass transition temperature greater than the higher of said first and said second layer.

2. An oriented multilayer film, as defined in claim 1, wherein said film is a coextruded, tubular film.

3. An oriented multilayer film, as defined in claim 1, wherein said core layer comprises a polyamide.

4. An oriented multilayer film as defined in claim 1, wherein said core layer comprises a gas barrier layer.

5. A process for producing an oriented multilayer film comprising a core layer, a first layer on one side of said core layer and a second layer on the opposite side of said core layer, which process comprises heating a multilayer film with infrared heaters and stretching said multilayer film under conditions sufficient to produce an oriented multilayer film wherein said heating conditions are set to provide an orientation temperature, as measured at the outside of the film, below both melting points of said first and second layers and below the glass transition temperature (Tg) of the core layer wherein said Tg is greater than the higher of said melting points of said first and second layers.

6. A process, as defined in claim 5, wherein multilayer film is a tubular film.

7. A process, as defined in claim 5, wherein said multilayer film is a coextruded film.

8. A process, as defined in claim 5, wherein said multilayer film is an extrusion coated film.

9. A process, as defined in claim 5, wherein said multilayer film is a slot cast film.

10. A process, as defined in claim 5, wherein said multilayer film is stretched by tentering.

11. A process, as defined in claim 5, wherein said exit orientation temperature is about 10° C. to 20° C. below the lower of the melting points of said first and second layers.

12. A process, as defined in claim 5, wherein said orientation temperature is between about 100° C. and 110° C.

13. A process, as defined in claim 5, wherein at least one of said first and second layers has a melting point of at least about 115° C.

14. A process, as defined in claim 5, wherein said core layer comprises a polyamide.

15. A process, as defined in claim 5, wherein said core layer comprises an amorphous nylon.

16. A process, as defined in claim 5, wherein at least one of said first and second layers is an outermost layer of said film.

17. A process, as defined in claim 5, wherein both of said first and second layers are outermost layers of said film.

18. A process, as defined in claim 5, wherein at least one of said first and second layers comprises LLDPE, VLDPE or mixtures thereof.

19. A process, as defined in claim 5, wherein both of said first and second layers comprise LLDPE, VLDPE or mixtures thereof.

20. A process, as defined in claim 5, wherein said core layer absorbs infrared heat sufficient to reach a temperature for orientation whereby said heat is transferred to said core layer for absorption by penetration of outer portions of said film including at least one of said first and second layers.

21. A process, as defined in claim 5, wherein during stretching said core layer is heated to an orientation temperature which is above the glass transition temperature of the core layer by absorbance of infrared heat, which infrared heat first penetrates at least one of said first and second layers at a plurality of wavelengths, whereby said first and second layers are heated to orientation temperatures below these respective melting points.

22. A process, as defined in claim 5, wherein said core layer and said first and second layers are oriented.

23. A process, as defined in claim 5, wherein said film further comprises at least one additional layer between said core layer and at least one of said first and second layers.

24. A process, as defined in claim 5, wherein said core layer comprises nylon 6I, 6T.

25. A process, as defined in claim 5, wherein said multilayer film is simultaneously stretched in both the machine direction and in the transverse direction.

26. A process, as defined in claim 5, wherein said film is tubular and said transverse stretching is produced by air pressure.

27. A process, as defined in claim 5, wherein at least one layer of said film is cross-linked.

28. A process, as defined in claim 27, wherein said cross-linking is performed by treatment of said film with between about 1 to 10 Mrad of irradiation subsequent to orientation.

29. A process for producing an oriented multilayer film comprising a polyamide core layer, a first layer on one side of said core layer and a second layer on the opposite side of said core layer, which process comprises heating said multilayer film with infrared heat and stretching said heated film under conditions sufficient to orient said first, second and core layers of said film, wherein said heating conditions provide an orientation temperature, as measured at the outside of the film, below both melting points of said first and second layers and below the glass transition temperature (Tg) of the core layer, wherein said Tg of the core layer is greater than the higher of said melting points of said first and second layers.

30. A process, as defined in claim 29, wherein said core layer comprises nylon 6I, 6T.

31. A process, as defined in claim 29, wherein said higher melting point is at least about 115° C.

32. A process, as defined in claim 29, wherein said orientation temperature is between about 100° C. to 110° C.

33. A process, as defined in claim 29, wherein said polyamide core layer comprises amorphous nylon.

34. A process, as defined in claim 33, wherein said higher melting point is at least about 115° C.

* * * * *